(12) United States Patent
Hong et al.

(10) Patent No.: US 9,777,153 B2
(45) Date of Patent: *Oct. 3, 2017

(54) POLYALKYLENE CARBONATE RESIN COMPOSITION HAVING AN INTERPENETRATING CROSSLINKED STRUCTURE

(71) Applicants: SK Innovation Co., Ltd., Seoul (KR); SK Global Chemical Co., Ltd., Seoul (KR)

(72) Inventors: Seung Gweon Hong, Daejeon (KR); Jae Young Park, Daejeon (KR); Hye Lim Kim, Daejeon (KR); Ji Yeon Choi, Daejeon (KR); Kwang Jin Chung, Daejeon (KR); Myung Ahn Ok, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/398,578

(22) PCT Filed: May 3, 2013

(86) PCT No.: PCT/KR2013/003868
§ 371 (c)(1),
(2) Date: Nov. 3, 2014

(87) PCT Pub. No.: WO2013/165214
PCT Pub. Date: Nov. 7, 2013

(65) Prior Publication Data
US 2015/0099829 A1  Apr. 9, 2015

(30) Foreign Application Priority Data

May 4, 2012 (KR) .................. 10-2012-0047714
Apr. 30, 2013 (KR) .................. 10-2013-0048292

(51) Int. Cl.
| | | |
|---|---|---|
| *C08L 69/00* | (2006.01) |
| *C08L 71/02* | (2006.01) |
| *C08L 75/04* | (2006.01) |
| *C08G 18/44* | (2006.01) |
| *C08G 18/32* | (2006.01) |
| *C08G 64/34* | (2006.01) |
| *C08J 3/24* | (2006.01) |
| *C08L 67/02* | (2006.01) |
| *C08K 5/10* | (2006.01) |
| *C08K 5/1515* | (2006.01) |
| *C08G 18/75* | (2006.01) |
| *C08G 18/42* | (2006.01) |
| *C08L 63/00* | (2006.01) |

(52) U.S. Cl.
CPC ............. *C08L 69/00* (2013.01); *C08G 18/42* (2013.01); *C08G 18/44* (2013.01); *C08G 18/758* (2013.01); *C08G 64/34* (2013.01); *C08J 3/246* (2013.01); *C08L 63/00* (2013.01); *C08L 71/02* (2013.01); *C08G 2270/00* (2013.01); *C08J 2369/00* (2013.01); *C08J 2433/12* (2013.01); *C08J 2463/00* (2013.01); *C08L 2201/08* (2013.01); *C08L 2205/04* (2013.01); *C08L 2205/05* (2013.01)

(58) Field of Classification Search
CPC ...................................................... C08L 69/00
See application file for complete search history.

(56) References Cited

U.S. PATENT DOCUMENTS

| | | | |
|---|---|---|---|
| 4,342,793 A | 8/1982 | Skinner et al. | |
| 4,912,149 A | 3/1990 | Robeson et al. | |
| 4,946,884 A | 8/1990 | Kuphal et al. | |
| 4,950,696 A * | 8/1990 | Palazotto | C08F 2/50 430/280.1 |
| 5,110,850 A * | 5/1992 | Farkas | C08K 5/34922 524/100 |
| 6,767,986 B2 | 7/2004 | Moethrath et al. | |
| 8,252,886 B2 | 8/2012 | Kim et al. | |

(Continued)

FOREIGN PATENT DOCUMENTS

| | | | | |
|---|---|---|---|---|
| CN | WO 2010115567 A1 * | 10/2010 | ............. | C08G 18/12 |
| DE | WO 2012013506 A1 * | 2/2012 | ......... | C08G 18/0823 |

(Continued)

OTHER PUBLICATIONS

Huang et al., "Epoxy Resins Toughened by Poly(propylene carbonate)," Journal of Applied Polymer Science (1997), 64(12), pp. 2457-2465.*
Chen et al., "Complexes and IPN of CO2 Copolymers," Polymers for Advanced Technologies, vol. 12, pp. 687-692 (2001).*
Barreto, C. et al., Novel solventless purification of poly(propylene carbonate): Tailoring the composition and thermal properties of PPC, Polymer Degradation and Stability, Mar. 30, 2012, pp. 893-904, vol. 97.
Chen et al., "Complexes and IPN of CO2 Copolymers", Polymers for Advanced Technologies, 2001, pp. 687-692, vol. 12.

(Continued)

*Primary Examiner* — Randy Gulakowski
*Assistant Examiner* — Ha S Nguyen
(74) *Attorney, Agent, or Firm* — The Webb Law Firm

(57) ABSTRACT

A polyalkylene carbonate resin composition with interpenetrating network structure includes an aliphatic polycarbonate obtained through a reaction of carbon dioxide with at least one epoxide compound selected from the group consisting of (C2-C10)alkylene oxide substituted or unsubstituted with halogen or alkoxy, (C4-C20)cycloalkylene oxide substituted or unsubstituted with halogen or alkoxy, and (C8-C20)styrene oxide substituted or unsubstituted with halogen, alkoxy, alkyl or aryl, at least one compound selected from a polyol compound, an epoxy compound and an acryl compound, and a curing agent for polymerization or networking.

15 Claims, No Drawings

(56) References Cited

U.S. PATENT DOCUMENTS

| | | | |
|---|---|---|---|
| 2011/0281048 A1* | 11/2011 | Yoon | C08G 64/0208 428/35.7 |
| 2012/0059078 A1 | 3/2012 | Kim et al. | |
| 2013/0337204 A1* | 12/2013 | Michel | C08G 18/44 428/35.8 |

FOREIGN PATENT DOCUMENTS

| | | | |
|---|---|---|---|
| EP | 0188791 | A1 | 7/1986 |
| EP | 2426174 | A1 | 3/2012 |
| KR | 20030085495 | A | 11/2003 |
| KR | 1020090090154 | A | 8/2009 |
| KR | 1020100013255 | A | 2/2010 |
| KR | 1020100067593 | A | 6/2010 |
| KR | 1020120024477 | A | 3/2012 |
| WO | 2011005664 | A2 | 1/2011 |

OTHER PUBLICATIONS

Rong et al., "Structure and Performance of the Polycarbonate-Modified Epoxy Resin", Chinese Journal of Materials Research, Apr. 1994, pp. 169-175, vol. 8, No. 2.

Fu, "Research Means and Performance of Polyurethane IPN", Journal of China Institute of Metrology, Sep. 2002, pp. 221-224, vol. 13, No. 3 (English-language abstract attached).

* cited by examiner

POLYALKYLENE CARBONATE RESIN COMPOSITION HAVING AN INTERPENETRATING CROSSLINKED STRUCTURE

CROSS-REFERENCE TO RELATED APPLICATIONS

This application is the United States national phase of International Application No. PCT/KR2013/003868 filed May 3, 2013, and claims priority to Korean Patent Application Nos. 10-2012-0047714 and 10-2013-0048292, filed May 4, 2012 and Apr. 30, 2013, respectively, the disclosures of which are hereby incorporated in their entirety by reference.

BACKGROUND OF THE INVENTION

Field of the Invention

The present invention relates to a resin composition having an interpenetrating polymer network structure including an aliphatic polycarbonate obtained by copolymerizing carbon dioxide with at least one epoxide compound.

Description of the Related Art

Recently, as a method of decreasing the generation of carbon dioxide as a countermeasure on global warming, industrialization of an aliphatic polycarbonate has been developed. The aliphatic polycarbonate is a soft rubber phase plastic and has good processing properties. The decomposing properties of the aliphatic polycarbonate may be easily controlled, and thus, is widely studied as a biodegradable polymer. However, the aliphatic polycarbonate has low glass transition temperature (Tg) and is easily decomposed at about 200° C., and thus has weak heat-resistance. As for mechanical properties of the aliphatic polycarbonate, the elasticity is small, and a thin film product thereof is fragile. Thus, the application of the aliphatic polycarbonate in various fields is restricted. Accordingly, techniques on heightening the glass transition temperature or the heat-resistance, or improving the mechanical strength are required. For example, U.S. Pat. No. 4,946,884 discloses a resin composition in which polypropylene carbonate and polymethylmethacrylate (PMMA) are molten and mixed, or a binder for mold processing ceramics or metal powder is included. U.S. Pat. No. 4,912,149 discloses on improving mechanical properties by melting and mixing polyvinyl chloride acetate. However, only by blending different resins according to the disclosures, the improvement of the mechanical properties is limited. Thus, the structural improvement is necessary.

Interpenetrating polymer network (IPN) is a multicomponent-based polymer in which at least one component has a network structure, and at least one component is polymerized or networked in the presence of other components to generate interpenetration between polymer chains. Due to the network structure, the degree of the polymer chains is large. Thus, frequently generated phase separation in a polymer blend may be restrained, and dual phase continuity in which two phases make a continuous phase may be obtained. Thus, improvements on various physical properties may be expected. Accordingly, researches on applying an IPN structure is necessary in order to overcome the limitation of the physical properties of the polyalkylene carbonate resin and to enlarge an application range thereof.

PRIOR ART DOCUMENTS

Patent Documents

U.S. Pat. No. 4,946,884
U.S. Pat. No. 4,912,149

SUMMARY OF THE INVENTION

An aspect of the present invention provides a polyalkylene carbonate resin composition with interpenetrating polymer network structure, in which a polyalkylene carbonate resin is applied to an interpenetrating polymer network (IPN) structure to remarkably improve mechanical properties and chemical-resistance, and to maximize clarity, heat-resistance and molding processing properties.

According to an aspect of the present invention, there is provided a polyalkylene carbonate resin composition with interpenetrating network structure. The composition includes an aliphatic polycarbonate obtained through a reaction of carbon dioxide with at least one epoxide compound selected from the group consisting of (C2-C10)alkylene oxide substituted or unsubstituted with halogen or alkoxy; (C4-C20)cycloalkylene oxide substituted or unsubstituted with halogen or alkoxy; and (C8-C20)styrene oxide substituted or unsubstituted with halogen, alkoxy, alkyl or aryl. The composition also includes at least one compound selected from a polyol compound, an epoxy compound and an acryl compound; and a curing agent for polymerization or networking.

The polyalkylene carbonate resin composition with the interpenetrating network structure in accordance with example embodiments may include 5 to 950 parts by weight of the polyol compound with respect to 100 parts by weight of the aliphatic polycarbonate, and a curing agent of 0.9 to 1.2 equivalent times of the hydroxyl equivalent of the polyol compound.

The aliphatic polycarbonate may be represented by following Chemical Formula 1.

[Chemical Formula 1]

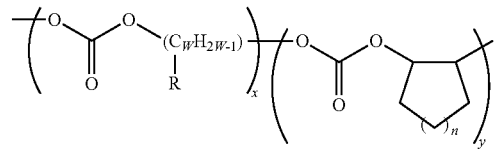

In Chemical Formula 1, w is an integer of 2 to 10, x is an integer of 5 to 100, y is an integer of 0 to 100, n is an integer of 1 to 3, and R is hydrogen, (C1-C4)alkyl or —$CH_2$—O—R' (R' is (C1-C8)alkyl).

The aliphatic polycarbonate in accordance with an example embodiment may have a weight average molecular weight (Mw) of 10,000 to 350,000.

A melt index (150° C./5 kg) of the aliphatic polycarbonate in accordance with an example embodiment may be 0.01 to 350.

In an example embodiment, the polyol compound may be at least one selected from the group consisting of polyester polyol, polyether polyol and polycarbonate polyol. In this case, the polyol compound may be a low molecular weight polyol, and the weight average molecular weight of 200 to 30,000.

In an example embodiment, the epoxy compound may be at least one selected from the group consisting of a glycidyl ether-based compound, a glycidyl ester-based compound, a glycidyl amine-based compound, a linear aliphatic compound and a cycloaliphatic compound.

In an example embodiment, the acryl compound may be at least one selected from the group consisting of methyl acrylate, ethyl acrylate, propyl acrylate, butyl acrylate, heptyl acrylate, 2-ethyl hexyl acrylate, octyl acrylate, methyl methacrylate, ethyl methacrylate, decyl methacrylate and 2-ethyl butyl methacrylate. In this case, an initiator such as a peroxide compound may be added to initiate a reaction.

In the polyalkylene carbonate resin composition with interpenetrating network structure, the curing agent may be at least one or two selected from an isocyanate-based compound, a melamine-based compound, an amine-based compound, an acid anhydride-based compound, an imidazole-based compound and a mercaptan-based compound.

With respect to an urethane IPN, the curing agent of the isocyanate-based compound and the melamine-based compound may be added one by one.

The isocyanate-based curing agent in accordance with an example embodiment may be at least one selected from the group consisting of 2,4-trilene diisocyanate, 2,6-trilene diisocyanate, hydrogenated trilene diisocyanate, 1,3-xylene diisocyanate, 1,4-xylene diisocyanate, diphenyl methane-4,4-diisocyanate, 1,3-bisisocyanatomethyl cyclohexane, tetramethyl xylene diisocyanate, 1,5-naphthalene diisocyanate, 2,2,4-trimethyl hexamethylene diisocyanate, 2,4,4-trimethyl hexamethylene diisocyanate and triphenylmethane triisocyanate, and at least one type of an adduct type, a biuret type and a trimer thereof may be used.

The melamine-based compound in an example embodiment may be at least one selected from the group consisting of hexa methoxy methyl melamine, hexa ethoxy methyl melamine, hexa propoxy methyl melamine, hexa butoxy methyl melamine, hexa pentyloxy methyl melamine and hexa hexyloxy methyl melamine.

The amine-based compound in an example embodiment may be a linear amine, an aliphatic amine, a modified aliphatic amine, an aromatic amine, a secondary amine and a tertiary amine. Particularly, the amine-based compound may be benzyldimethyl amine, triethanol amine, triethylene tetramine, diethylene triamine, triethylene amine, dimethylaminoethanol, tridimethylaminomethylphenol, etc.

In an example embodiment, the acid anhydride-based compound may be at least one selected from the group consisting of phthalic anhydride, maleic anhydride, trimellitic anhydride, pyromellitic anhydride, hexahydrophthalic anhydride, tetrahydrophthalic anhydride, methylnadic anhydride, nadic anhydride, methylhexahydrophthalic anhydride, etc. These compounds may be used alone or as a mixture thereof.

In an example embodiment, the imidazole-based compound may be at least one selected from the group consisting of imidazole, isoimidazole, 2-methylimidazole, 2-ethyl-4-methylimidazole, 2,4-dimethylimidazole, butylimidazole, 2-heptadecenyl-4-methylimidazole, 2-methylimidazole, 2-undecenylimidazole, 1-vinyl-2-methylimidazole, 2-n-heptadecylimidazole, 2-undecylimidazole, 2-heptadecylimidazole, 2-phenylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole, an added product of the imidazole and methylimidazole, an added product of the imidazole and trimellitic acid, 2-n-heptadecyl-4-methylimidazole, phenylimidazole, benzylimidazole, 2-methyl-4,5-diphenylimidazole, 2,3,5-triphenylimidazole, 2-styrylimidazole, 1-(dodecylbenzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzyl-1,4,2-naphthyl-4,5-diphenylimidazole, 1-benzyl-2-methylimidazole, 2-p-methoxystyrylimidazole, etc. These compounds may be used alone or as a mixture thereof.

In an example embodiment, the mercaptan-based compound may be called as polymercaptan and may be at least one selected from the group consisting of pentaerythritol, tetrathio glycol, polysulfide, and trioxane trimethylene mercaptan.

In an example embodiment, the polyalkylene carbonate resin composition with the interpenetrating network structure may further include at least one additive selected from the group consisting of a pigment, a dye, a filler, an anti-oxidant, an ultraviolet blocking agent, an antistatic agent, a blocking preventing agent, a slipping agent, an inorganic filler, a mixing agent, a stabilizer, a viscosity imparting resin, a modifying resin, a leveling agent, a fluorescent whitening agent, a dispersing agent, a thermal stabilizer, a light stabilizer, an ultraviolet absorbent and a lubricant.

According to another aspect of the present invention, there is provided a molded product including the polyalkylene carbonate resin composition with the interpenetrating network structure.

The polyalkylene carbonate resin composition with the interpenetrating network structure according to the present invention may have a remarkably improved heat-resistance and chemical-resistance, and may have maximized physical properties such as impact strength, an elastic deformation rate, a compression deformation rate and elongation strength, etc. The polyalkylene carbonate resin may be applied in various fields. Particularly, clarity may be improved through a uniform molecular structure, and the preparation process may be simplified to save producing cost and to accomplish an economic advantage.

DETAILED DESCRIPTION OF THE PREFERRED EMBODIMENT

Exemplary embodiments of the present invention will now be described hereinafter.

The applicant of the present invention introduced an interpenetrating polymer network (IPN) structure into a polyalkylene carbonate resin to confirm the clarity through uniform molecular structure and to remarkably improve heat-resistance, chemical-resistance, mechanical properties such as elongation strength, elongation rate, impact-resistance, etc. and filed the present invention.

The polyalkylene carbonate resin composition with the interpenetrating network structure in accordance with example embodiments may be obtained by dissolving an aliphatic polycarbonate, a polyol compound and a curing agent by 0.9 to 1.2 times of the hydroxyl equivalent of the polyol compound in a solvent such as methyl ethyl ketone (MEK), and conducting a reaction at 80° C. for a time being, or through conducting a reactive extrusion at 120 to 200° C.

The polyalkylene carbonate resin composition with the interpenetrating network structure in accordance with example embodiments may be obtained by dissolving an aliphatic polycarbonate and an epoxy compound in a solvent and adding an appropriate equivalent of the curing agent to form a network structure. Otherwise, the aliphatic polycarbonate, the epoxy compound and the curing agent are added and a reactive extrusion at 120 to 220° C. may be conducted.

The polyalkylene carbonate resin composition with the interpenetrating network structure in accordance with example embodiments may be obtained by dissolving an aliphatic polycarbonate and an acryl compound in a solvent, and adding an appropriate equivalent of a reaction initiator or a catalyst to form a network structure. Otherwise, the aliphatic polycarbonate, the acryl compound, and the initiator or the catalyst are added and a reactive extrusion at 120 to 220° C. may be conducted.

Aliphatic polycarbonates disclosed in prior arts (Korean Laid-open Patent Publication Nos. 2008-0015454, 2009-0090154, 2010-067593 and 2010-0013255) may be used in the present invention.

The aliphatic polycarbonate may be prepared by a copolymerization reaction of carbon dioxide with at least one epoxide compound selected from the group consisting of: (C2-C20)alkylene oxide substituted or unsubstituted with halogen, (C1-C20)alkyloxy, (C6-C20)aryloxy or (C6-C20)aryl(C1-C20)alkyloxy; (C4-C20)cycloalkylene oxide substituted or unsubstituted with the halogen, (C1-C20)alkyloxy, (C6-C20)aryloxy or (C6-C20)aryl(C1-C20)alkyloxy; and (C8-C20)styrene oxide substituted or unsubstituted with the halogen, (C1-C20)alkyloxy, (C6-C20)aryloxy, (C6-C20)aryl(C1-C20)alkoxy or (C1-C20)alkyl.

In this case, the epoxide compound may be at least one selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, glycidyl methyl ether, glycidyl ethyl ether, glycidyl normal propyl ether, glycidyl secondary butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal eicosyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbornene, limonene oxide, dieldrin, 2,3-epoxide propylbenzene, styrene oxide, phenyl propylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxidepropyl ether, epoxypropyl methoxyphenyl ether, biphenyl glycidyl ether, glycidyl naphthyl ether, glycidol acetic acid ester, glycidyl propionate, glycidyl butanoate, glycidyl normal pentanoate, glycidyl normal hexanoate, glycidyl heptanoate, glycidyl normal octanoate, glycidyl 2-ethylhexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl eicosanoate.

The aliphatic polycarbonate may be polyalkylene carbonate represented by the following Chemical Formula 1.

[Chemical Formula 1]

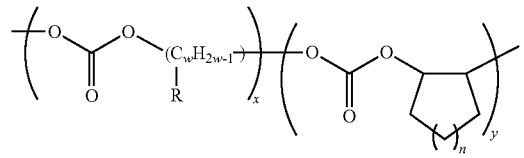

In Chemical Formula 1, w is an integer of 2 to 10, x is an integer of 5 to 100, y is an integer of 0 to 100, n is an integer of 1 to 3, and R is hydrogen, (C1-C4)alkyl or —$CH_2$—O—R' (R' is (C1-C8)alkyl).

In this case, the alkylene in the polyalkylene carbonate may include ethylene, propylene, 1-butylene, cyclohexene oxide, alkylglycidyl ether, n-butyl and n-octyl, without limitation.

The polyalkylene carbonate may be prepared by alternately copolymerizing at least one epoxide selected from the group consisting of (C2-C20)alkylene oxide substituted or unsubstituted with halogen, (C1-C20)alkyloxy, (C6-C20)aryloxy or (C6-C20)aryl(C1-C20)alkyloxy; (C4-C20)cycloalkylene oxide substituted or unsubstituted with halogen, (C1-C20)alkyloxy, (C6-C20)aryloxy or (C6-C20)aryl(C1-C20)alkyloxy; and (C8-C20)styrene oxide substituted or unsubstituted with halogen, (C1-C20)alkyloxy, (C6-C20)aryloxy, (C6-C20)aryl(C1-C20)alkyloxy or (C1-C20)alkyl, with carbon dioxide by using a complex catalyst represented by the following Chemical Formula 2 in the presence of a polymer compound including a hydroxyl group or a carboxylic acid group at the terminal or side chain thereof.

[Chemical Formula 2]

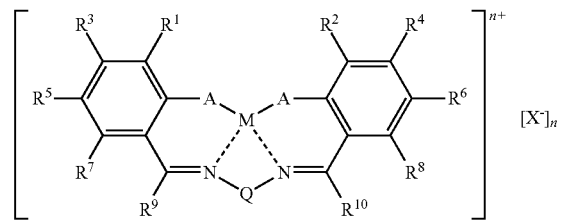

In Chemical Formula 2,

M is trivalent cobalt or trivalent chromium;

A is oxygen or sulfur atom;

Q is a diradical connecting two nitrogen atoms;

$R^1$ to $R^{10}$ are independently hydrogen; halogen; (C1-C20) alkyl; (C1-C20)alkyl including at least one of halogen, nitrogen, oxygen, silicon, sulfur and phosphor; (C2-C20) alkenyl; (C2-C20)alkenyl including at least one of halogen, nitrogen, oxygen, silicon, sulfur and phosphor; (C1-C20) alkyl(C6-C20)aryl; (C1-C20)alkyl(C6-C20)aryl including at least one of halogen, nitrogen, oxygen, silicon, sulfur and phosphor; (C6-C20)aryl(C1-C20)alkyl; (C6-C20)aryl(C1-C20)alkyl including at least one of halogen, nitrogen, oxygen, silicon, sulfur and phosphor; (C1-C20)alkoxy; (C6-C30)aryloxy; formyl; (C1-C20)alkylcarbonyl; (C6-C20) arylcarbonyl; or a metalloid radical of a $14^{th}$ group metal substituted with hydrocarbyl;

two among the $R^1$ to $R^{10}$ are connected to each other to form a ring;

at least one hydrogen included in the $R^1$ to $R^{10}$ and Q is a proton terminal selected from the group consisting of the following Chemical Formula a, Chemical Formula b, and Chemical Formula c;

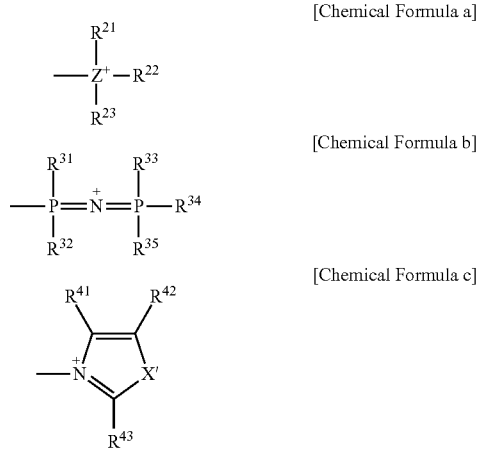

[Chemical Formula a]

[Chemical Formula b]

[Chemical Formula c]

$X^-$ independently represents halogen anion; $HCO_3^-$; $BF_4^-$; $ClO_4^-$; $NO_3^-$; $PF_6^-$; (C6-C20) aryloxy anion; (C6-C20) aryloxy anion including at least one of a halogen atom, a nitrogen atom, an oxygen atom, a silicon atom, a sulfur atom and a phosphor atom; (C1-C20)alkylcarboxy anion; (C1-C20)alkylcarboxy anion including at least one of a halogen atom, a nitrogen atom, an oxygen atom, a silicon atom, a sulfur atom and a phosphor atom; (C6-C20) arylcarboxy anion; (C6-C20) arylcarboxy anion including at least one of a halogen atom, a nitrogen atom, an oxygen atom, a silicon atom, a sulfur atom and a phosphor atom; (C1-C20)alkoxy anion; (C1-C20)alkoxy anion including at least one of a halogen atom, a nitrogen atom, an oxygen atom, a silicon atom, a sulfur atom and a phosphor atom; (C1-C20)alkylcarbonate anion; (C1-C20)alkylcarbonate anion including at least one of a halogen atom, a nitrogen atom, an oxygen atom, a silicon atom, a sulfur atom and a phosphor atom; (C6-C20) arylcarbonate anion; (C6-C20) arylcarbonate anion including at least one of a halogen atom, a nitrogen atom, an oxygen atom, a silicon atom, a sulfur atom and a phosphor atom; (C1-C20)alkylsulfonate anion; (C1-C20)alkylsulfonate anion including at least one of a halogen atom, a nitrogen atom, an oxygen atom, a silicon atom, a sulfur atom and a phosphor atom; (C1-C20)alkylamido anion; (C1-C20)alkylamido anion including at least one of a halogen atom, a nitrogen atom, an oxygen atom, a silicon atom, a sulfur atom and a phosphor atom; (C6-C20) arylamido anion; (C6-C20)arylamido anion including at least one of a halogen atom, a nitrogen atom, an oxygen atom, a silicon atom, a sulfur atom and a phosphor atom; (C1-C20)alkylcarbamate anion; (C1-C20)alkylcarbamate anion including at least one of a halogen atom, a nitrogen atom, an oxygen atom, a silicon atom, a sulfur atom and a phosphor atom; (C6-C20)arylcarbamate anion; (C6-C20) arylcarbamate anion including at least one of a halogen atom, a nitrogen atom, an oxygen atom, a silicon atom, a sulfur atom and a phosphor atom;

Z is nitrogen or phosphor atom;

$R^{21}$, $R^{22}$, $R^{23}$, $R^{31}$, $R^{32}$, $R^{33}$, $R^{34}$, and $R^{35}$ are independently (C1-C20)alkyl; (C1-C20)alkyl including at least one of halogen, nitrogen, oxygen, silicon, sulfur and phosphor; (C2-C20)alkenyl; (C2-C20)alkenyl including at least one of halogen, nitrogen, oxygen, silicon, sulfur and phosphor; (C1-C20)alkyl(C6-C20)aryl; (C1-C20)alkyl(C6-C20)aryl including at least one of halogen, nitrogen, oxygen, silicon, sulfur and phosphor; (C6-C20)aryl(C1-C20)alkyl; (C6-C20) aryl(C1-C20)alkyl including at least one of halogen, nitrogen, oxygen, silicon, sulfur and phosphor; or a metalloid radical of 14th group metal substituted with hydrocarbyl; two among $R^{21}$, $R^{22}$, and $R^{23}$ or two among $R^{31}$, $R^{32}$, $R^{33}$, $R^{34}$, and $R^{35}$, are connected to each other to form a ring;

$R^{41}$, $R^{42}$ and $R^{43}$ are independently hydrogen; (C1-C20) alkyl; (C1-C20)alkyl including at least one of halogen, nitrogen, oxygen, silicon, sulfur and phosphor; (C2-C20) alkenyl; (C2-C20)alkenyl including at least one of halogen, nitrogen, oxygen, silicon, sulfur and phosphor; (C1-C20) alkyl(C6-C20)aryl; (C1-C20)alkyl(C6-C20)aryl including at least one of halogen, nitrogen, oxygen, silicon, sulfur and phosphor; (C6-C20)aryl(C1-C20)alkyl; (C6-C20)aryl(C1-C20)alkyl including at least one of halogen, nitrogen, oxygen, silicon, sulfur and phosphor; or a metalloid radical of 14th group metal substituted with hydrocarbyl; two among $R^{41}$, $R^{42}$, and $R^{43}$, are connected to each other to form a ring;

X' is an oxygen atom, a sulfur atom or N—R (wherein, R is (C1-C20)alkyl);

n is an integer obtained by adding 1 to the total number of the proton terminal included in the $R^1$ to $R^{10}$ and Q;

$X^-$ may make a coordinate bond with M; and the nitrogen atom of an imine may be decoordinated from M.

The polyalkylene carbonate resin in accordance with preferred embodiment of the present invention may be polypropylene carbonate copolymerized from propylene oxide and carbon dioxide.

The polyalkylene carbonate in accordance with example embodiments may have a weight average molecular weight (Mw) of 10,000 to 350,000, and preferably have 30,000 to 250,000. In addition, the glass transition temperature (Tg) of the polyalkylene carbonate resin is 20 to 105° C., and the melt index (150° C./5 kg) is 0.01 to 350. By using the polyalkylene carbonate resin having the above-described properties may be easily processed to a pellet shape.

The polyalkylene carbonate in accordance with example embodiments may have a specific gravity of 1.15 to 1.35 g/cm³. When the specific gravity is deviated from the range, the above-mentioned effects may not be obtainable.

The polyalkylene carbonate resin composition with the interpenetrating network structure in accordance with example embodiments may include 5 to 950 parts by weight of the polyol compound with respect to 100 parts by weight of the aliphatic polycarbonate, and the curing agent of 0.9 to 1.2 equivalent times of the hydroxyl group equivalent of the polyol. When the amounts of the compounds are deviated from the above-mentioned ranges, unreacted polyisocyanate may remain or networking degree by curing may be insufficient.

The polyalkylene carbonate resin composition with the interpenetrating network structure in accordance with example embodiments may use the curing agent obtained by one of an isocyanate-based compound and a melamine-based compound, or a mixture of them.

In this case, the curing agent may be preferably applied using the isocyanate-based compound and the melamine-based compound one by one. When two or more curing agents are added at the same time to conduct a curing and networking process, the structure of an IPN structure system may be changed according to the reaction rate of the two curing agents. In this case, the structure may not be controlled to a desired structure. Thus, one of the curing agents may be used for the reaction, and then, other curing agent may be added to obtain the IPN having uniform structure.

In example embodiments, the isocyanate-based curing agent may be at least one selected from the group consisting of 2,4-trilene diisocyanate, 2,6-trilene diisocyanate, hydrogenated trilene diisocyanate, 1,3-xylene diisocyanate, 1,4-xylene diisocyanate, diphenylmethane-4,4-diisocyanate, 1,3-bisisocyanatomethyl cyclohexane, tetramethylxylene diisocyanate, 1,5-naphthalene diisocyanate, 2,2,4-trimethyl hexamethylene diisocyanate, 2,4,4-trimethyl hexamethylene diisocyanate and triphenylmethane triisocyanate.

The melamine-based curing agent in example embodiment may be at least one selected from the group consisting of hexa methoxy methyl melamine, hexa ethoxy methyl melamine, hexa propoxy methyl melamine, hexa butoxy methyl melamine, hexa pentyloxymethyl melamine and hexyloxy methyl melamine.

The polyol compound in example embodiments may be at least one selected from the group consisting of polyester polyol, polyether polyol and polycarbonate polyol.

In this case, the polyol compound may include a polyol having a low molecular weight and having a weight average molecular weight of 200 to 30,000. When the polyol has the deviated range of the weight average molecular weight, the networking due to a curing reaction may be difficult. When the molecular weight is too low, the molecular weight of a produced polymer by the curing reaction may not exceed 50 thousands, and when the polyol having the molecular weight of 30 thousands is used, an effective penetration between polyalkylene carbonate molecules may not be generated, and an effective IPN structure after the curing may not be obtainable.

The polyalkylene carbonate resin composition in accordance with example embodiments may include an aliphatic polycarbonate, an epoxy compound selected from glycidyl ether-based, glycidyl ester-based, glycidyl amine-based, a linear aliphatic or cycloaliphatic compounds, and a curing agent capable of polymerizing or networking with the compounds, and may have an interpenetrating network structure. In this case, the epoxy compound having a low molecular weight of which weight average molecular weight is 100 to 10,000 may make an effective penetration between the aliphatic polycarbonate molecules to form a good IPN structure after curing.

The polyalkylene carbonate resin composition in accordance with example embodiments may include an aliphatic polycarbonate, at least one acryl compound selected from an alkyl acrylate or an alkyl methacrylate including methyl acrylate, ethyl acrylate, propyl acrylate, butyl acrylate, heptyl acrylate, 2-ethyl hexylacrylate, octyl acrylate, methyl methacrylate, ethyl methacrylate, decyl methacrylate and 2-ethyl butyl methacrylate, and a curing agent possibly conducting polymerization or networking so as to form an interpenetrating network structure. In this case, the epoxy compound having a low molecular weight in which a weight average molecular weight is 100 to 10,000 may effectively penetrate between the aliphatic polycarbonate molecules, and a good IPN structure may be obtained after the curing.

The polyalkylene carbonate resin composition having the interpenetrating network structure and including the aliphatic polycarbonate and at least one compound selected from the polyol compound, the epoxy-based compound and the acryl-based compound, and the curing agent possibly conducting polymerization or networking, may preferably have the interpenetrating network structure by a reactive extrusion, or a solution reaction, without limitation.

The polyalkylene carbonate resin composition with the interpenetrating network structure in accordance with example embodiments may further include at least one additive selected from a pigment, a dye, a filler, an antioxidant, an ultraviolet blocking agent, an antistatic agent, a blocking preventing agent, a slipping agent, an inorganic filler, a mixing agent, a stabilizer, a viscosity imparting resin, a modifying resin, a leveling agent, a fluorescent whitening agent, a dispersing agent, a thermal stabilizer, alight stabilizer, an ultraviolet absorbent and a lubricant.

According to the present invention, a molded product including the polyalkylene carbonate resin composition with interpenetrating network structure may be provided.

Hereinafter, the present invention will be more apparent through the following example embodiments. The following example embodiments are only for illustration and are not intend to limit the scope of the present invention.

Examples 1 to 8

Polypropylene carbonate (PPC) having a weight average molecular weight of 89,000 and an ether linkage of 0.5% or less, polyester diol (U1420, Union Chemicals, Mw: 2,000) and polycarbonate diol (PCDL, G3452, Asahi KASEI Co., Mw: 2,000) were used by the amounts (by parts per weight) as illustrated in the following Table 1 to prepare resin compositions having IPN structures in accordance with example embodiments. The curing was conducted by using H12MDI (4,4'-dicyclohexyl-methane diisocyanate). Tg, Tm, strain at break and % strain at break of samples were measured by means of a Universal Test Machine (UTM), and the results are illustrated in Table 2.

TABLE 1

Polyurethane(PU)-IPN mixing ratio

| Division | Sample name | PPC | Diol | H12MDI | DBTDL |
|---|---|---|---|---|---|
| Example 1 | Ester PU 20 | 80 | 20 | 2.746 | 0.0263 |
| Example 2 | Ester PU 30 | 70 | 30 | 4.045 | 0.0389 |
| Example 3 | Ester PU 70 | 30 | 70 | 9.243 | 0.089 |
| Example 4 | Ester PU 80 | 20 | 80 | 9.243 | 0.101 |
| Example 5 | PCDL PU 20 | 80 | 20 | 2.746 | 0.0263 |
| Example 6 | PCDL PU 30 | 70 | 30 | 4.045 | 0.0389 |
| Example 7 | PCDL PU 70 | 30 | 70 | 9.243 | 0.089 |
| Example 8 | PCDL PU 80 | 20 | 80 | 9.243 | 0.101 |
| Comparative Example 1 | PPC | 100 | 0 | 0 | 0 |

TABLE 2

UTM measuring results

| Division | Tg | Tm | Stress at Break (Kg/cm$^2$) | % Strain at Break (%) |
|---|---|---|---|---|
| Example 1 | 32.9 | 45.37 | 384 | 55 |
| Example 2 | 32.6 | 45.01 | 558 | 79 |
| Example 3 | 26.0 | 46.11 | — | — |
| Example 4 | 23.4 | 45.81 | — | — |
| Example 5 | 33.8 | — | 366 | 1.7 |
| Example 6 | 30.2 | — | 391 | 160 |
| Example 7 | 31.7 | — | 590 | 508 |
| Example 8 | 37.5 | — | 631 | 646 |
| Comparative Example 1 | 34.4 | — | 366 | 1.7 |

Examples 9 to 12

Polypropylene carbonate (PPC) having a weight average molecular weight of 89,000, an ether linkage of 0.5% or less, an epoxy compound (KUKDO Chemical Co., Ltd., YD-128) and a polyamide-based curing agent (KUKDO Chemical Co., Ltd., G-640) were added by the amounts as illustrated in the following Table 3 to prepare resin compositions having the IPN structure in accordance with example embodiments. The adhesion strengths of the resin compositions were measured by measuring lap shear strength using UTM apparatus. As a substrate, polycarbonate was used, and two substrates having a certain size (1 inch×4 inch×0.5 mm=length×width×thickness) based on ASTM D 5868-01 standard were overlapped by 1 inch×1 inch area. Then, an adhesive material was coated between the overlapped sides, and the adhesive force was measured after one week. The adhesion force was measured at room temperature and at 70° C. Before measuring the adhesion force, the samples were put at 70° C. for 2 hours by using the UTM including a temperature controllable chamber, and the adhesion force was measured at 70 degrees. The samples were pulled by the rate of 50 mm/min, and the shear strength was measured and illustrated in the following Table 4.

TABLE 3

Epoxy-IPN mixing ratio

| Division | Sample name | PPC | Epoxy | G-640 |
|---|---|---|---|---|
| Example 9 | Epoxy 20 | 80 | 20 | 10 |
| Example 10 | Epoxy 30 | 70 | 30 | 15 |
| Example 11 | Epoxy 70 | 30 | 70 | 35 |
| Example 12 | Epoxy 80 | 20 | 80 | 40 |
| Comparative Example 2 | PPC | 100 | 0 | 0 |

TABLE 4

Measured results on adhesion force

| Division | Adhesion force at room temperature(25° C.) (MPa) | Adhesion force at 70 degrees (MPa) |
|---|---|---|
| Example 9 | 3.2 | 1.8 |
| Example 10 | 4.5 | 2.6 |
| Example 11 | 7.6 | 7.7 |
| Example 12 | 8.8 | 9.3 |
| Comparative Example 2 | 1.2 | 0 |

Examples 13 to 16

Polypropylene carbonate (PPC) having a weight average molecular weight of 89,000 and an ether linkage of 0.5% or less, an acryl compound (MMA, DAEJUNG Chemicals) and 2,2-azobis-isobutyronitrile (AIBN, DAEJUNG Chemicals) as a reaction initiator were added, and a reaction restraining agent of 4-methoxyphenol (Mph, Junsei Chemical) was used. The thus obtained solution was coated on a PET film by 5-100 mm/sec rate to a uniform thickness of 5-7 lam. The coated film was stood at room temperature for 30 minutes and dried at 70° C. condition, and surface hardness was measured. The surface hardness was measured by using a pencil hardness measuring apparatus (COAD606, OCEAN SCIENCE).

TABLE 5

Acryl-IPN mixing ratio

| Division | Sample name | PPC | MMA | Initiator | Reaction restraining agent |
|---|---|---|---|---|---|
| Example 13 | Acryl 20 | 80 | 20 | 1 | 0.1 |
| Example 14 | Acryl 30 | 70 | 30 | 1.5 | 0.15 |
| Example 15 | Acryl 70 | 30 | 70 | 3.5 | 0.35 |
| Example 16 | Acryl 80 | 20 | 80 | 4 | 0.4 |
| Comparative Example 3 | PPC | 100 | 0 | 0 | 0 |

TABLE 6

Hardness measured results

| Division | Hardness (H) |
|---|---|
| Example 13 | 2 |
| Example 14 | 2 |
| Example 15 | 3 |
| Example 16 | 3 |
| Comparative Example 3 | 1 |

As illustrated in Table 2, the resin compositions in accordance with example embodiments have the IPN structure and were confirmed to generate Tm in addition to Tg and to change molecular structures. Through forming the IPN structure, a crystalline portion may be introduced into an amorphous polymer to improve mechanical strength and to confirm the stability of a cell when forming foam. In addition, when a 100% amorphous structure is formed after the IPN structure forming, the clarity of the polyalkylene carbonate may not be largely damaged, but chemical-resistance may be improved. Thus, when the resin composition is applied as a binder in a paint composition or an ink, chromaticity may be increased. Through the change of the components of various polyols and through the change of curing methods, desired physical properties may be provided.

As illustrated in Table 4, since the resin composition has the IPN structure in accordance with example embodiments, heat-resistance and adhesive performance may be improved. Thus, application of the resin composition as a paint composition or an adhesive agent may be possible.

As illustrated in Table 6, since the resin composition has the IPN structure in accordance with example embodiments, the hardness may be increased. Thus, an application of the resin composition in injection molding of a high performance film or a case may be possible.

While the present invention has been shown and described in connection with the exemplary embodiments, it will be apparent to those skilled in the art that modifications and variations can be made without departing from the spirit and scope of the invention as defined by the appended claims.

What is claimed is:
1. A resin composition comprising an interpenetrating polymer network comprising:
(a) an aliphatic polycarbonate having a weight average molecular weight between 30,000 and 350,000, obtained through a reaction of carbon dioxide with at least one epoxide compound selected from the group consisting of (C2-C10)alkylene oxide substituted or unsubstituted with halogen or alkoxy; (C4-C20)cycloalkylene oxide substituted or unsubstituted with halogen or alkoxy; and (C8-C20)styrene oxide substituted or unsubstituted with halogen, alkoxy, alkyl or aryl, wherein the aliphatic polycarbonate is represented by Chemical Formula 1:

[Chemical Formula 1]

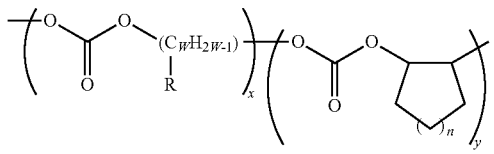

wherein in Chemical Formula 1, w is an integer of 2 to 10, x is an integer of 5 to 100, y is an integer of 0 to 100, n is an integer of 1 to 3, and R is hydrogen, (C1-C4)alkyl or —$CH_2$—O—R' (R' is (C1-C8)alkyl); and (b) the reaction product of:
  (i) a polyol compound having a weight average molecular weight between 200 and 30,000; and
  (ii) a curing agent having functional groups capable of reacting with hydroxyl functional groups of the polyol compound to form the reaction product, wherein the reaction product is penetrated into the aliphatic polycarbonate to form an interpenetrating network.

2. The resin composition of claim 1, wherein the aliphatic polycarbonate has a melt index (150° C./5 kg) between 0.01 and 350.

3. The resin composition of claim 1, wherein the aliphatic polycarbonate is polypropylene carbonate or polyethylene carbonate.

4. The resin composition of claim 1, wherein the polyol compound is at least one selected from the group consisting of polyester polyol, polyether polyol and polycarbonate polyol.

5. The resin composition of claim 1, wherein the curing agent is at least one selected from an isocyanate-based compound, a melamine-based compound, an amine-based compound, an acid anhydride-based compound, an imidazole-based compound and a mercaptan-based compound.

6. The resin composition of claim 5, wherein the isocyanate-based compound is at least one selected from the group consisting of 2,4-trilene diisocyanate, 2,6-trilene diisocyanate, hydrogenated trilene diisocyanate, 1,3-xylene diisocyanate, 1,4-xylene diisocyanate, diphenyl methane-4,4-diisocyanate, 1,3-bisisocyanatomethyl cyclohexane, tetramethyl xylene diisocyanate, 1,5-naphthalene diisocyanate, 2,2,4-trimethyl hexamethylene diisocyanate, 2,4,4-trimethyl hexamethylene diisocyanate and triphenylmethane triisocyanate.

7. The polyalkylene carbonate resin composition of claim 5, wherein the melamine-based curing agent is at least one selected from the group consisting of hexa methoxy methyl melamine, hexa ethoxy methyl melamine, hexa propoxy methyl melamine, hexa butoxy methyl melamine, hexa pentyloxy methyl melamine and hexa hexyloxy methyl melamine.

8. The polyalkylene carbonate resin composition of claim 5, wherein the amine-based curing agent is at least one selected from the group consisting of benzyldimethyl amine, triethanol amine, triethylene tetramine, diethylene triamine, triethylene amine, dimethylaminoethanol, and tridimethylaminomethylphenol.

9. The polyalkylene carbonate resin composition of claim 5, wherein the acid anhydride curing agent is at least one selected from the group consisting of phthalic anhydride, maleic anhydride, trimellitic anhydride, pyromellitic anhydride, hexahydrophthalic anhydride, tetrahydrophthalic anhydride, methylnadic anhydride, nadic anhydride and methylhexahydrophthalic anhydride.

10. The polyalkylene carbonate resin composition of claim 5, wherein the imidazole-based curing agent is at least one selected from the group consisting of imidazole, isoimidazole, 2-methylimidazole, 2-ethyl-4-methylimidazole, 2,4-dimethylimidazole, butylimidazole, 2-heptadecenyl-4-methylimidazole, 2-methylimidazole, 2-undecenylimidazole, 1-vinyl-2-methylimidazole, 2-n-heptadecylimidazole, 2-undecylimidazole, 2-heptadecylimidazole, 2-phenylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole, an added product of the imidazole and methylimidazole, an added product of the imidazole and trimellitic acid, 2-n-heptadecyl-4-methylimidazole, phenylimidazole, benzylimidazole, 2-methyl-4,5-diphenylimidazole, 2,3,5-triphenylimidazole, 2-styrylimidazole, 1-(dodecylbenzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzyl-1, 4,2-naphthyl-4,5-diphenylimidazole, 1-benzyl-2-methylimidazole, and 2-p-methoxystyrylimidazole.

11. The polyalkylene carbonate resin composition of claim 5, wherein the mercaptan-based curing agent is at least one selected from the group consisting of pentaerythritol, tetrathio glycol, polysulfide, and trioxane trimethylene mercaptan.

12. The resin composition of claim 1, comprising 5 to 950 parts by weight of the polyol compound with respect to 100 parts by weight of the aliphatic polycarbonate, and 0.9 to 1.2 times of equivalents of the curing agent with respect to hydroxy equivalent of the polyol polymer.

13. The resin composition of claim 5, wherein the isocyanate-based curing agent and the melamine-based curing agent are included in a reaction one by one.

14. The resin composition of claim 1, further comprising at least one additive selected from the group consisting of a pigment, a dye, a filler, an anti-oxidant, an ultraviolet blocking agent, an antistatic agent, a blocking preventing agent, a slipping agent, an inorganic filler, a mixing agent, a stabilizer, a viscosity imparting resin, a modifying resin, a leveling agent, a fluorescent whitening agent, a dispersing agent, a thermal stabilizer, a light stabilizer, an ultraviolet absorbent and a lubricant.

15. A molded product comprising the resin composition of claim 1.

* * * * *